United States Patent
Pautis et al.

(10) Patent No.: US 11,840,348 B2
(45) Date of Patent: Dec. 12, 2023

(54) BRACED-PYLON ARCHITECTURE FOR MOUNTING AN ENGINE TO AN AIRCRAFT

(71) Applicant: Airbus Operations SAS, Toulouse (FR)

(72) Inventors: Olivier Pautis, Toulouse (FR); Jérôme Colmagro, Toulouse (FR)

( * ) Notice: Subject to any disclaimer, the term of this patent is extended or adjusted under 35 U.S.C. 154(b) by 0 days.

(21) Appl. No.: 17/509,113

(22) Filed: Oct. 25, 2021

(65) Prior Publication Data

US 2022/0127010 A1 Apr. 28, 2022

(30) Foreign Application Priority Data

Oct. 27, 2020 (FR) ..................................... 2010987

(51) Int. Cl.
*F02C 7/20* (2006.01)
*B64D 27/26* (2006.01)

(52) U.S. Cl.
CPC ............... *B64D 27/26* (2013.01); *F02C 7/20* (2013.01); *B64D 2027/264* (2013.01); *B64D 2027/266* (2013.01); *B64D 2027/268* (2013.01)

(58) Field of Classification Search
CPC .. B64D 27/18; B64D 27/26; B64D 2027/262; B64D 2027/264; B64D 2027/266; B64D 2027/268

See application file for complete search history.

(56) References Cited

U.S. PATENT DOCUMENTS

| | | | | |
|---|---|---|---|---|
| 5,320,307 A * | 6/1994 | Spofford | ............... | B64D 27/18 60/797 |
| 5,467,941 A * | 11/1995 | Chee | ...................... | B64D 27/18 244/54 |
| 2005/0082423 A1 * | 4/2005 | Whitmer | ............... | B64D 27/26 244/54 |
| 2009/0108127 A1 * | 4/2009 | Cazals | ................... | B64D 27/26 244/54 |
| 2012/0111996 A1 * | 5/2012 | Lafont | .................. | B64D 27/26 244/54 |
| 2013/0327058 A1 * | 12/2013 | Balk | ...................... | B64D 27/18 60/797 |

(Continued)

FOREIGN PATENT DOCUMENTS

| | | |
|---|---|---|
| FR | 3078950 A1 | 9/2019 |
| WO | 9518042 A1 | 7/1995 |

(Continued)

*Primary Examiner* — Todd E Manahan
*Assistant Examiner* — Marc J Amar
(74) *Attorney, Agent, or Firm* — Greer, Burns & Crain, Ltd.

(57) ABSTRACT

An engine mounting pylon for suspending a turbofan beneath an aircraft wing, including a primary structure, a fastening device for fastening to the turbofan, and a fastening device for fastening to the wing. The engine mounting pylon furthermore comprises multiple rigid braces that mechanically connect the primary structure to the wing of the aircraft, a first brace-attachment device that mechanically connects a first end of each brace to the wing, and a second brace-attachment device that mechanically connects a second end of each brace to the primary structure. This braced-pylon architecture makes it possible to reduce the dimensions of the primary structure and the various elements that constitute the first and second attachment devices.

8 Claims, 3 Drawing Sheets

(56) References Cited

U.S. PATENT DOCUMENTS

| | | | | |
|---|---|---|---|---|
| 2015/0013142 A1* | 1/2015 | West | ............... | B64D 27/26 29/525.08 |
| 2016/0221682 A1* | 8/2016 | Pautis | ............... | B64D 27/18 |
| 2019/0283890 A1* | 9/2019 | Pautis | ............... | B64D 27/26 |

FOREIGN PATENT DOCUMENTS

| | | | |
|---|---|---|---|
| WO | 2006056678 A1 | 6/2006 | |
| WO | 2011012821 A2 | 2/2011 | |

* cited by examiner

BRACED-PYLON ARCHITECTURE FOR MOUNTING AN ENGINE TO AN AIRCRAFT

CROSS-REFERENCES TO RELATED APPLICATIONS

This application claims the benefit of the French patent application No. 2010987 filed on Oct. 27, 2020, the entire disclosures of which are incorporated herein by way of reference.

FIELD OF THE INVENTION

The present invention relates to an engine mounting pylon for an aircraft. Such a pylon has the function of connecting an aircraft engine to a structural element of the aircraft, such as for example a wing, a fuselage rear part or an element of the empennage.

The invention applies to all types of aircraft fitted with any type of propulsion system, such as, for example, turbofans or turboprops. In general, with regard to civil aircraft able to transport at least 100 passengers, these are fitted with at least one engine suspended beneath each wing via a mounting pylon or attached on each side of a fuselage rear part.

BACKGROUND OF THE INVENTION

The architecture of the engine mounting pylons on the right or left of the fuselage may be identical or symmetrical.

In the text that follows, the concepts of vertical and horizontal, of front and rear, of top and bottom or of lower and upper are to be considered with respect to the position of an aircraft on the ground.

The primary function of an engine mounting pylon is to support the engine, for example to suspend an engine beneath an aircraft wing, and to allow the engine to transfer, among other things, the thrust it generates to the rest of the aircraft in order to propel it. The engine mounting pylon also serves to route the hydraulic or pneumatic conduits, and the electrical cables connecting the engine to the various engine control members, and also to route the conduits for supplying fuel to the engine.

The known engine mounting pylons are constituted by a primary structure and a secondary structure. The primary structure is realized in the form of a structural box that is mechanically connected above the wing via a pylon/wing attachment device and to the upper part of the engine via a pylon/engine attachment device. The secondary structure is composed of various fairing elements that make it possible to reduce the drag generated in flight by the air flow around the engine mounting pylon and to integrate the various fittings and routings for the systems present in the propulsion system therein. A fairing front part has an aerodynamic profile that makes it possible to manage the bifurcation of the air stream on either side of the front of the engine mounting pylon to the most effective extent. The fairing rear part of the pylon, also referred to as APF for Aft Pylon Fairing, is situated at the rear of the engine mounting pylon. The APF ensures that the directions of flow of the layers of air on either side of the pylon progressively converge so that at their junction the turbulence is reduced to a minimum.

The structural box forming the primary structure is composed of a lower spar, an upper spar and lateral panels. On the inside, ribs give it the structural rigidity to transmit to the wing the mechanical stresses to which the engine is subjected during the various flight phases of the aircraft. Elements for fastening the engine to the pylon are located on the lower spar and elements for fastening the pylon beneath the wing are located on the upper spar.

The elements for fastening the engine to the pylon and the elements for fastening the pylon beneath the wing form isostatic attachment systems that make it possible to react to the bending and torsional stresses and also to the thrust force that are transmitted by the engine to the wing via the engine mounting pylon. These elements for fastening the engine mounting pylon beneath the wing are composed of linking elements, shackles and shear pins connecting the mounting pylon from above to suspension elements beneath the wing and to support elements above the engine. In general, these suspension and support elements are connected via reinforcing elements, of the interface-fitting type, to the structural elements of the engine and of the wing.

The development of proposed propulsion systems for propelling aircraft tends towards ever-heavier and -bulkier engines that generate increased thrust, such as, for example, turbofans with an ultrahigh bypass ratio, also referred to as UHBR. The increase in the weight and diameter of the engines suspended beneath the wings gives rise to additional constraints on the geometry and the weight of the pylons for mounting these engines. This is because, since the engines are bulkier, the space available between the wings and the ground for installing the engines and their mounting pylon is more restricted. Moreover, the weight and the greater thrust of the UHBR turbofans generate more stresses on their mounting pylon, which gives rise to an increase in weight and enlargement of the dimensions of all the elements that constitute the mounting pylons. Enlarging the geometric dimensions of the pylon increases the difficulty of installing it in the restricted space available between the wing and the engine and impairs the aerodynamics of the latter. In addition, enlarging the dimensions of the pylon and in particular the width of its primary structure has a substantial influence on the drag generated by the engine mounting pylon.

SUMMARY OF THE INVENTION

An object of the present invention is to propose an engine mounting pylon that makes it possible to reduce the dimensions of its primary structure and the forces generated at the structural interfaces between the pylon and the wing.

To this end, according to a first aspect of the invention, what is proposed is a pylon for mounting an aircraft engine to an aircraft structural element, the engine mounting pylon comprising a primary structure, a first fastening device for fastening to an aircraft engine and a second fastening device for fastening to the aircraft structural element, wherein the second fastening device for fastening to the aircraft structural element comprises at least one brace, a first brace-attachment device that mechanically connects a first end of the at least one brace to the aircraft structural element, and a second brace-attachment device that mechanically connects a second end of the at least one brace to the primary structure, the second device for attachment to the aircraft structural element furthermore comprising a ball-joint attachment that mechanically connects the rear of the primary structure to the structural element of the aircraft, the mounting pylon comprising at least two lateral braces that take up the bending moment (MfZ) generated about a Z axis that is substantially perpendicular to the aircraft structural element to which the mounting pylon is attached and that passes through the ball-joint attachment, and at least two transverse braces that take up the torsion moments (MtX)

generated about an X axis that is substantially parallel to the direction of movement of the aircraft and that passes through the ball-joint attachment.

This braced-pylon architecture makes it possible to reduce the dimensions of the primary structure and the various elements that constitute the attachment devices.

Preferably, the at least one brace is a connecting rod.

Advantageously, the first attachment device comprises a shackle-type device, a first part of which is mechanically connected to the aircraft structural element, a second part of which is mechanically connected to the first end of the at least one brace, and a first pin of which connects the first part and the second part of the shackle-type device.

Preferably, the first part of the shackle-type device is mechanically connected to the aircraft structural element via a reinforcing plate.

Advantageously, the second attachment device comprises a shackle-type device comprising an attachment bracket and a bracing ring. The attachment bracket and the bracing ring are mechanically interconnected by a second shackle pin, and are mechanically connected respectively either to the primary structure or to the second end of the at least one brace.

Advantageously, the mounting pylon furthermore comprises at least one upper brace and one lower brace that take up the bending moments generated about a Y axis that is substantially perpendicular to the X and Z axes and that passes through the ball-joint attachment. The lower and upper braces extend substantially in a plane that includes the X and Z axes.

Preferably, the lower brace rearwardly continues the primary structure.

According to a second aspect of the invention, an aircraft comprising at least one engine suspended beneath a wing via an engine mounting pylon as described above is proposed.

Advantageously, the primary structure of the engine mounting pylon is installed in cantilever fashion on the front of the wing beneath which it is mechanically connected.

BRIEF DESCRIPTION OF THE DRAWINGS

Other features and advantages of the invention are highlighted by the following description of non-limiting exemplary embodiments of different aspects of the invention. The description refers to the appended figures, which are also given by way of non-limiting exemplary embodiments of the invention.

DETAILED DESCRIPTION OF THE PREFERRED EMBODIMENTS

Figure 1:
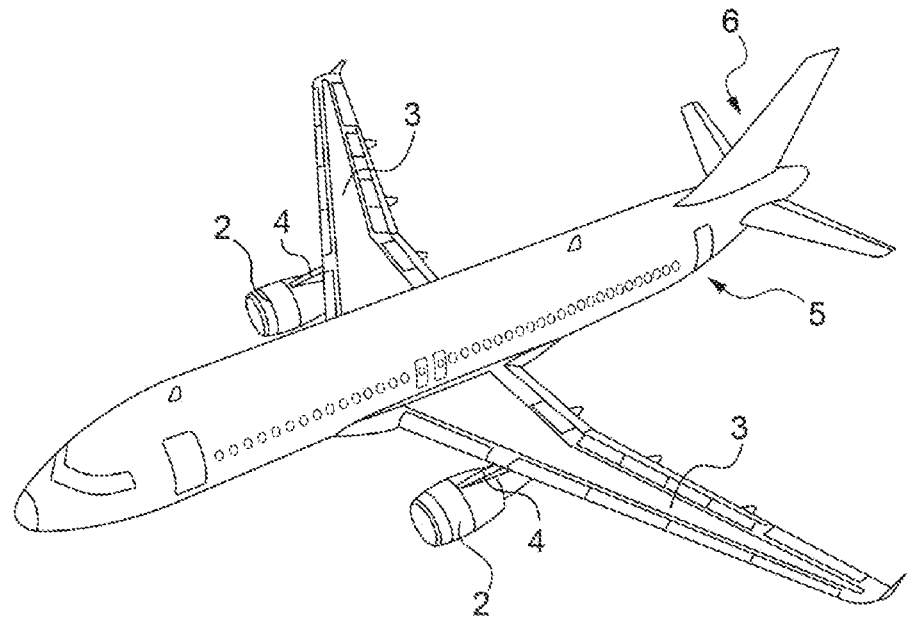
FIG. 1 shows a perspective view of an aircraft fitted with engine mounting pylons according to the invention.

FIG. 1 shows an aircraft 1 fitted with two turbofans 2, for example of UHBR type. However, the invention may be implemented with any type of propulsion system, including un-ducted fan engines. The turbofans 2 are each installed beneath a wing 3 via an engine mounting pylon 4. In the following text, the invention will be described on the basis of this type of installation of the propulsion system. However, the invention may be used with other engine installation architectures, for example on the wings, on either side of the fuselage rear part 5 or on the empennage 6.

The turbofan 2 is mounted beneath the mounting pylon 4, which is itself suspended beneath the wing 3. The engine mounting pylon 4 is attached to the wing 3 via its rear part such that its front part, to which the engine 2 is mounted, is located in cantilever fashion with respect to the wing 3.

The mounting pylon 4 comprises a primary structure 7 at least partially surrounded by a secondary structure (not shown) that forms an aerodynamic fairing in order to reduce the impact of the mounting pylon 4 on the drag of the aircraft 1. FIGS. 2 to 5 show a mounting pylon 4 without the secondary structure, a turbofan 2 without its nacelle and the wing 3 without the skin that covers it, in order to be able to see an engine structural part 8 and a wing structural part 9, to each of which the mounting pylon 4 is mechanically fastened.

The architecture of the mounting pylon 4 will be described below using FIGS. 2 to 5, which show it in perspective and in various directions.

The primary structure 7 representing the central element of the engine mounting pylon 4 is formed by a structural box. As an alternative, the primary structure 7 could be formed by a profiled beam. The structural box comprises a lower spar 10 on which is situated a first fastening device that isostatically connects the engine structural part 8 to the lower spar 10, and an upper spar 11 on which is situated a second fastening device that likewise isostatically connects the primary structure 7 to the wing structural part 9. It should be noted that it is also possible that the pylon/aircraft or pylon/engine attachments are not isostatic.

The lower spar 10 and the upper spar 11 are interconnected by lateral walls 12 to form the structural box. In order to reinforce it, ribs (not shown) may be housed in the structural box.

Figure 4:
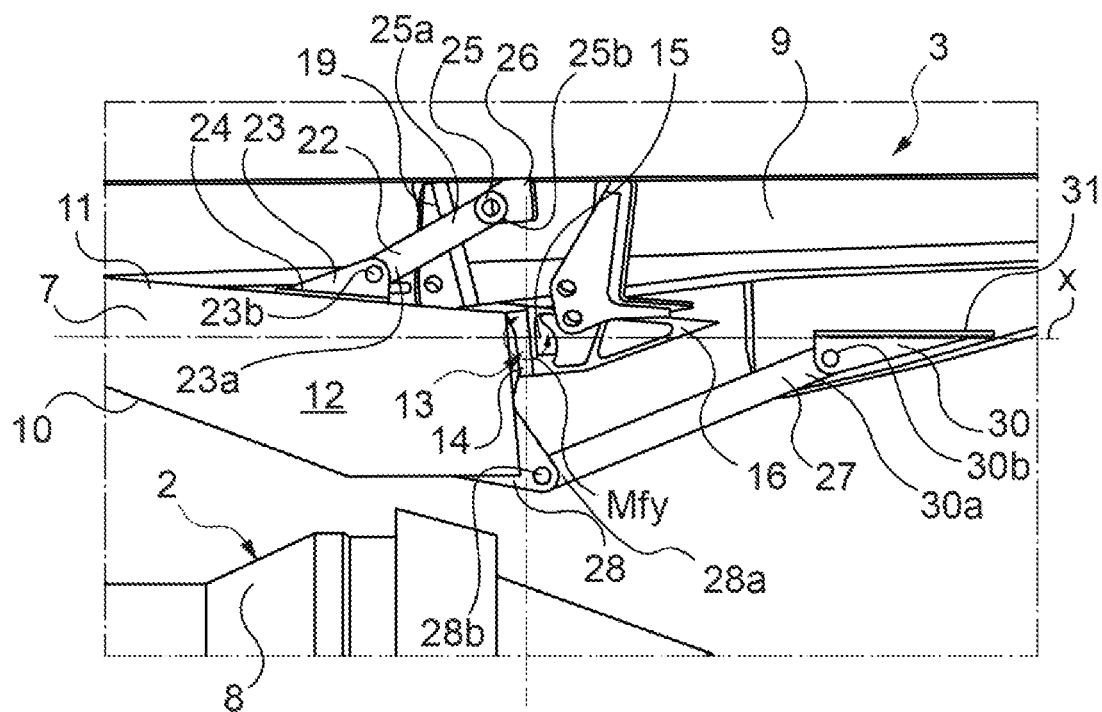
FIG. 4 shows a side view of an engine mounting pylon according to the invention.

The primary structure 7 formed by the structural box described above is mechanically connected beneath the wing 3 by a ball-joint attachment 13, which is part of the second fastening device. The ball-joint attachment 13 is positioned in the longitudinal median plane of the structural box forming the primary structure 7. As illustrated in FIG. 4, the ball-joint attachment 13 is constituted of a sphere 14 attached to the rear face of the primary structure 7. The sphere 14 is supported in a ball-joint seat 15, which is integral with an attachment shoe 16 that is mechanically attached beneath the wing 3. The ball-joint attachment extends rearwards in the continuation of the primary structure 7.

Figure 2:
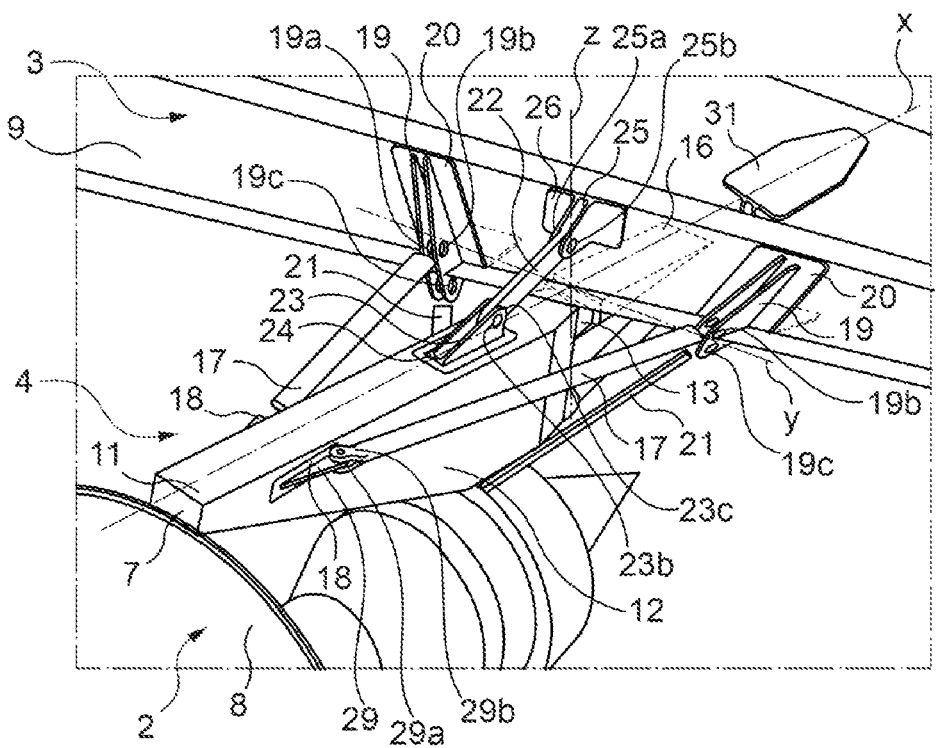
FIG. 2 shows a perspective view of an engine mounting pylon according to the invention.

As illustrated in FIG. 2, the primary structure 7 is, on the other hand, connected to the wing 3 (more specifically to the wing structural part 9) via a plurality of braces 17, 21, 22, 27 which are also part of the second fastening device. In the preferred embodiment illustrated, these braces are rigid and in the form of connecting rods. In the following text, the bracing system described is realized by connecting rods. As is explained below, the combination of the primary structure 7 with the braces 17, 21, 22, 27 forms a braced-pylon architecture. Some of the mechanical forces normally transmitted to the primary structure are thus discharged into the braces, this making it possible to reduce the dimensions of the primary structure, in particular, its width. Specifically, the bracing of the primary structure 7 makes it possible to reduce its dimensions, in particular its width, by 20% to 40%, this having a positive impact on the bifurcation of the air streams at the front of the engine mounting pylon 4. In addition, this facilitates the closing-up of the air streams at the rear of the pylon, making it possible to reduce the size of, or even remove the APF.

Increasing the number of the rigid braces that brace the primary structure 7 makes it possible to reduce the forces at the interface between the engine mounting pylon 4 and the wing 3. Consequently, the size of the joining devices between the engine mounting pylon 4 and the wing 3 and the size of the structural reinforcing parts in line with these joining devices on the primary structure 7 and the wing 3 can be reduced. In addition to the reduction of the drag caused by the aerodynamic obstruction created by the engine mounting pylons 4 in the front part of the turbofans 2, this braced architecture of the engine mounting pylon 4 makes it possible to substantially decrease the weight of the assembly formed by the engine mounting pylon 4. The architecture of the engine mounting pylon 4 according to the invention thus makes it possible to decrease the specific consumption of the aircraft and to improve the block fuel of the turbofan (that is to say the quantity of fuel to be taken onboard to supply the turbofans in order to complete a mission type).

A lateral brace 17 is mechanically attached to the front part of each lateral wall 12 of the primary structure 7 and extends substantially horizontally towards the rear, forming an acute angle with the respective lateral wall 12. The lateral braces 17 are attached so as to be articulated at their interfaces with the primary structure 7 and with the wing structural part 9 via shackle-type devices. In the implementation example described, these shackle-type devices are plate/bracket devices.

Figure 5:
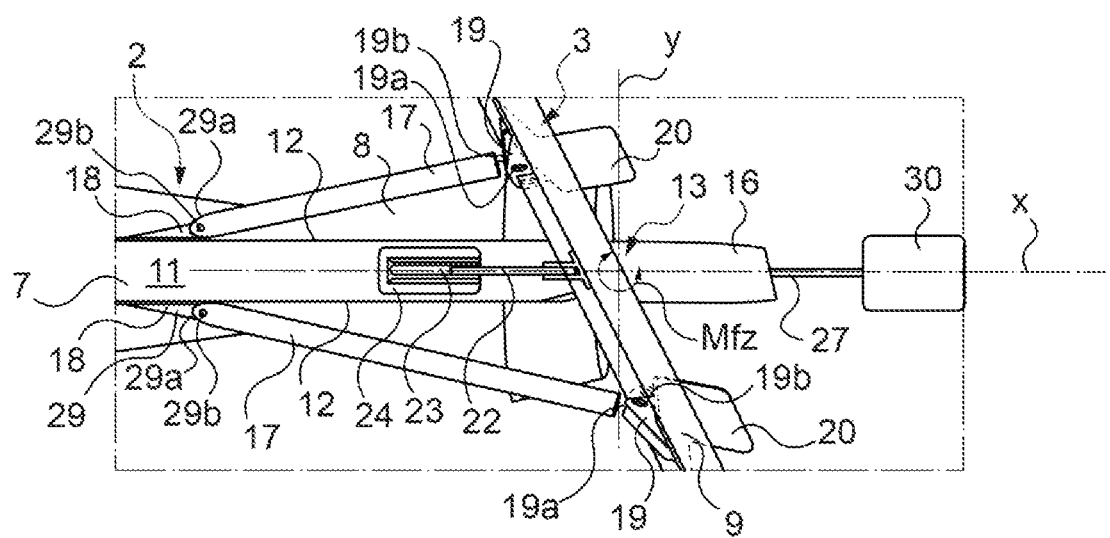
FIG. 5 shows a top view of an engine mounting pylon according to the invention.

As illustrated in FIGS. 2 and 5, a first attachment plate 29, in which an opening is made so as to form a clevis, is mechanically attached to the front of each lateral wall 12 by a fixing plate 18. Each first attachment plate 29 is connected via a second shackle pin 29b to a bracket 29a mechanically attached to the front end of each lateral brace 17, which forms a shackle-type attachment device. A hole is made in the other end 19a of each lateral brace 17 (or a ring is attached there) in order to receive a first shackle pin 19b. This pin is held by a first attachment bracket 19, which is connected to the wing structural part 9 via a first reinforcing plate 20.

The lateral braces 17 allow the stresses generated by the bending moment MfZ to be discharged along the Z axis and around the ball-joint attachment 13.

A transverse brace 21 is mechanically attached to the rear lower part of each lateral wall 12 of the primary structure 7 and extends substantially vertically upwards, forming an acute angle with the respective lateral wall 12. As an alternative, the transverse braces 21 may be connected to the engine structural part 8, or, in another alternative, to an intermediate element referred to as 'rear engine-fastening beam' (not shown), which is positioned between the rear spar 10 of the box of the primary structure 7 and the rear part (turbine casing zone) of the engine structure 8. The transverse braces 21 are attached so as to be articulated at their interfaces with the primary structure 7 and with the wing structural part 9. In the implementation example described here, these brace attachments are also shackle-type devices. In this instance, these shackle-type devices are realized by plate/bracket devices.

Figure 3:
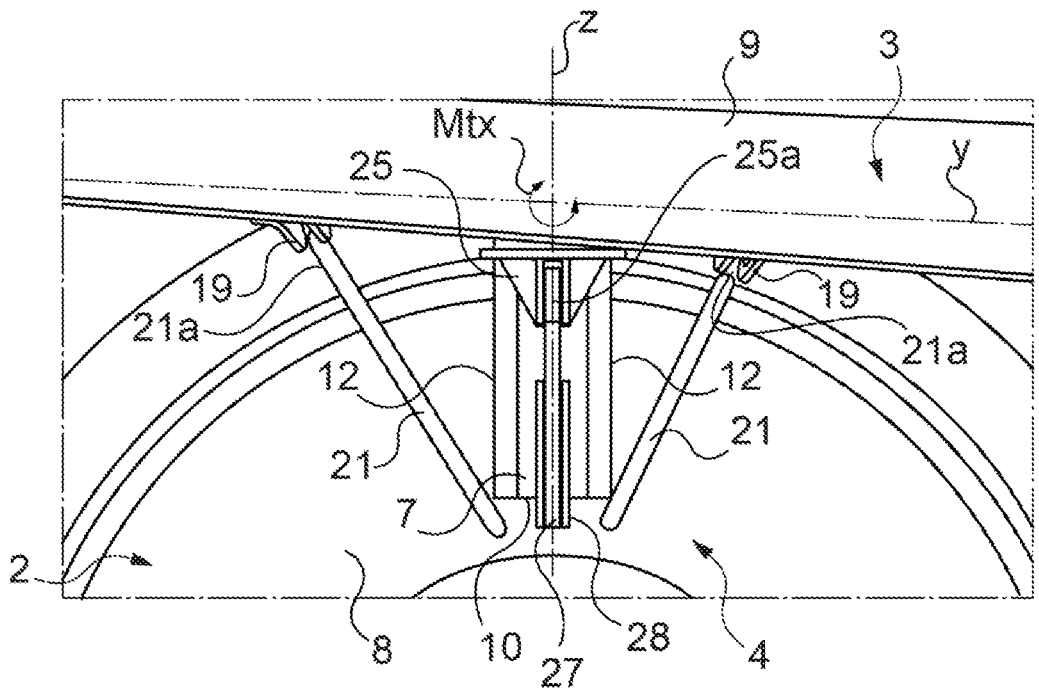
FIG. 3 shows a rear view of an engine mounting pylon according to the invention.

As illustrated in FIGS. 2 and 3, a hole is made in the upper end 21a of each transverse brace 21 (or a ring is attached there) in order to receive a first shackle pin 19c. This pin is held by a first attachment bracket 19, which is connected to the wing structural part 9 via the reinforcing plate 20. Each attachment bracket 19 thus has two pairs of holes to hold the two first shackle pins 19b, 19c of the lateral braces 17 and transverse braces 21. The lower end of each transverse brace 21 is also connected in an articulated manner via a shackle device (not shown) that is similar to that of the horizontal lateral braces 17.

The transverse braces 21 allow the stresses generated by the torsion moment MtX to be discharged along the X axis around the ball-joint attachment 13.

An upper brace 22 is mechanically attached to the upper spar 11 of the primary structure 7 and extends upwards and rearwards, forming an angle with the upper spar 11, in order to reach the front edge of the wing structural part 9 to which it is connected. The upper brace 22 is attached so as to be articulated via shackle-type devices at its interfaces with the primary structure 7 and the wing structural part 9.

As illustrated in FIGS. 2 and 4, an orifice is made in each end 23a and 25a of the upper brace 22 (as an alternative, a ring may be attached to one of the ends or to the two ends of the upper brace 22) in order to connect the upper brace 22 via a first and a second shackle pin 23b and 25b, on the one hand, to a second attachment bracket 23 mechanically attached via a second attachment plate 24 to the upper spar 11, and, on the other hand, to a third attachment bracket 25 mechanically attached via a second reinforcing plate 26 to the front of the wing structural part 9.

A lower brace 27, which doubles up the upper brace 22, is mechanically attached to the lower rear part of the primary structure 7 and extends upwards and rearwards, in order to reach the bottom of the wing 3 to which it is connected. In the embodiment illustrated, the lower brace 27 is substantially parallel to the upper brace 22. The lower brace 27 is attached so as to be articulated at its interfaces with the primary structure 7 and the wing 3.

As illustrated in FIGS. 2 and 4, an orifice is made in each end 28a and 30a of the lower brace 27 (as an alternative, a ring may be attached to one of the ends or to the two ends of the lower brace 27) in order to connect the lower brace 27 via a first and a second shackle pin 28b and 30b, on the one hand, to a fourth attachment bracket 28 mechanically attached to the lower rear part of the primary structure 7, and, on the other hand, to a fifth attachment bracket 30 mechanically attached via a third reinforcing plate 31 to the bottom of the wing 3.

The upper brace 22 and the lower brace 27 allow the stresses generated by the bending moment MfY to be discharged along the Y axis and around the ball-joint attachment 13.

Such an architecture, in particular by way of the lower brace 27 that rearwardly continues the primary structure 7, makes it possible to reduce its length, thereby making it even easier to close up the air streams to the rear of the engine mounting pylon 4, and possibly to eliminate the APF. It is therefore possible to achieve an additional weight saving.

Moreover, by way of its general configuration, such an architecture is considered to be robust enough to tolerate the loss or breakage of one of the brace elements 17, 21, 22 or 27. In aeronautical terminology, a 'fail-safe' system is spoken of here. This is linked to the fact that each lateral brace 17 is doubled up by a transverse brace 21, thus there are two braces (one lateral brace 17 and one transverse brace 21) distributed on either side of the pylon primary structure 7 and substantially symmetrical on a vertical plane including the X and Z axes. In addition, as mentioned above, the upper brace 22 is doubled up by the lower brace 27 (and vice versa).

Although in the above description the particular aspects of the invention, in particular the implementation of the engine mounting pylon, are described in the context of a turbofan of UHBR type that is suspended beneath the wing of an aircraft, the engine mounting pylons according to the invention can make it possible to install any other type of aircraft engine in the fuselage rear part or on the empennage. In the event of installation beneath the wings, one or two engines may be installed beneath each wing. In addition, it is possible that only some of the braces described are implemented in order to reduce the size of the primary structure 7 only in one or more dimensions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pylon for mounting an engine to an aircraft structural element, said engine mounting pylon comprising:
   a primary structure comprising a lower and an upper spar interconnected by lateral walls,
   a fastener to attach the pylon to an aircraft structural element comprising:
      a plurality of braces,
      a first shackle-type device mechanically connecting a first end of each brace of the plurality of braces to the aircraft structural element,
      a second shackle-type device mechanically connecting a second end of each brace of the plurality of braces to the primary structure of the pylon,
      a ball-joint attachment that mechanically connects the rear of the primary structure of the pylon directly to the aircraft structural element,
      said engine mounting pylon further comprising a lateral first brace of the plurality of braces and a lateral second brace of the plurality of braces attached to a front part of each lateral wall of the primary structure that take up a bending moment generated about a Z axis that is perpendicular to the aircraft structural element to which the mounting pylon is attached and that passes through the ball-joint attachment, and
      a transverse third brace of the plurality of braces and a transverse fourth brace of the plurality of braces attached to a rear lower part of each lateral wall of the primary structure that take up torsion moments generated about an X axis that is parallel to a direction of movement of the aircraft and that passes through the ball-joint attachment.

2. The pylon for mounting an aircraft engine according to claim 1, wherein said first brace is a connecting rod.

3. The pylon for mounting an aircraft engine according to claim 1, wherein the first shackle-type device has a first part of which is mechanically connected to the aircraft structural element, a second part of which is mechanically connected to a respective said first end of each of the plurality of braces, and a first pin of which connects the first part and the second part of the first shackle-type device.

4. The pylon for mounting an aircraft engine according to claim 3, wherein the first part of the first shackle-type device of each of the plurality of braces is mechanically connected to the aircraft structural element via a reinforcing plate.

5. The pylon for mounting an aircraft engine according to claim 1, further comprising an upper fifth brace of the plurality of braces and a lower sixth brace of the plurality of braces that take up a bending moment generated about a Y axis that is perpendicular to X and Z axes and that passes through the ball-joint attachment, said upper fifth brace and said lower sixth brace extending in a plane parallel to the X and Z axes.

6. The pylon for mounting an aircraft engine according to claim 5, wherein said lower sixth brace rearwardly continues the primary structure.

7. An aircraft comprising at least one engine suspended beneath a wing via an engine mounting pylon as defined in claim 1.

8. The aircraft according to claim 7, wherein the primary structure of the engine mounting pylon is installed in cantilever fashion on a front of the wing beneath which it is mechanically connected.

* * * * *